(12) United States Patent
Nakatsuka et al.

(10) Patent No.: US 9,134,942 B2
(45) Date of Patent: Sep. 15, 2015

(54) PRINTING SYSTEM, INTERMEDIATE SERVER, PRINTING DEVICE, JOB SYSTEM, METHOD FOR EXECUTING PRINT JOB, AND COMPUTER-READABLE STORAGE MEDIUM FOR COMPUTER PROGRAM

(71) Applicant: KONICA MINOLTA, INC., Chiyoda-ku (JP)

(72) Inventors: Mitsunori Nakatsuka, Amagasaki (JP); Kouichi Tomita, Kawanishi (JP); Masato Fujii, Nagaokakyo (JP); Kiyoshi Miyake, Takarazuka (JP); Kei Nakahara, Suita (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/318,954

(22) Filed: Jun. 30, 2014

(65) Prior Publication Data

US 2015/0002895 A1    Jan. 1, 2015

(30) Foreign Application Priority Data

Jul. 1, 2013  (JP) .................................. 2013-137767

(51) Int. Cl.
*G06F 3/12*         (2006.01)
(52) U.S. Cl.
CPC .............. *G06F 3/1285* (2013.01); *G06F 3/121* (2013.01); *G06F 3/126* (2013.01); *G06F 3/1211* (2013.01); *G06F 3/1229* (2013.01); *G06F 3/1267* (2013.01); *G06F 3/1268* (2013.01); *G06F 3/1288* (2013.01)
(58) Field of Classification Search
None
See application file for complete search history.

(56) References Cited

U.S. PATENT DOCUMENTS

| 2001/0055125 | A1 | 12/2001 | Yamada et al. |
| 2002/0101611 | A1* | 8/2002 | Shima .......................... 358/1.15 |
| 2003/0093670 | A1* | 5/2003 | Matsubayashi et al. ...... 713/168 |

(Continued)

FOREIGN PATENT DOCUMENTS

| JP | 2002-082792 A | 3/2002 |
| JP | 2002-189581 A | 7/2002 |

(Continued)

OTHER PUBLICATIONS

Office Action (Notification of Reason(s) for Refusal) issued on Apr. 28, 2015, by the Japanese Patent Office in corresponding Japanese Patent Application No. 2013-137767, and an English Translation of the Office Action. (6 pages).

*Primary Examiner* — Marcus T Riley
(74) *Attorney, Agent, or Firm* — Buchanan Ingersoll & Rooney PC

(57) ABSTRACT

An intermediate server used outside a network having one or more printing devices and a distributing server for distributing data to each of said one or more printing devices is provided. The intermediate server includes a receiving portion for receiving job data for execution of a print job and designation data indicating an identifier of each executing printing device that is to execute the print job among the printing devices; a first transmission portion for sending, to the distributing server, the job data and the designation data received; a saving portion for saving the job data when the job data cannot be transferred to the distributing server; and a second transmission portion for sending, in response to a request from any one of the printing devices, the job data saved in the saving portion to the printing device as a request source.

20 Claims, 14 Drawing Sheets

(56) References Cited

U.S. PATENT DOCUMENTS

| | | | |
|---|---|---|---|
| 2003/0149791 A1* | 8/2003 | Kane et al. | 709/246 |
| 2004/0148335 A1 | 7/2004 | Keeney et al. | |
| 2005/0243804 A1 | 11/2005 | Watai | |
| 2011/0299122 A1 | 12/2011 | Kawakami | |
| 2014/0201320 A1* | 7/2014 | Kokal et al. | 709/217 |

FOREIGN PATENT DOCUMENTS

| | | |
|---|---|---|
| JP | 2004-102959 A | 4/2004 |
| JP | 2005-301999 A | 10/2005 |
| JP | 2007-048031 A | 2/2007 |
| JP | 2011-251513 A | 12/2011 |
| JP | 2011-253318 A | 12/2011 |

\* cited by examiner

FIG. 6

PLEASE SELECT IMAGE FORMING APPARATUS AS OUTPUT DESTINATION AND PRESS "PRINT" BUTTON.

- CB — ☐ MFP_a001 (HEAD OFFICE・ACCOUNTS DEPARTMENT)
- CB — ☐ MFP_a002 (HEAD OFFICE・HUMAN RESOURCE DEPARTMENT)
- CB — ☐ MFP_a003 (HEAD OFFICE・DEVELOPMENT DEPARTMENT)
- CB — ☐ MFP_b001 (OSAKA BRANCH・FIRST SALES DEPARTMENT)
- CB — ☐ MFP_b002 (OSAKA BRANCH・SECOND SALES DEPARTMENT)
- CB — ☐ MFP_b003 (OSAKA BRANCH・GENERAL AFFAIRS DEPARTMENT)
- CB — ☐ MFP_b001 (OSAKA BRANCH・FIRST SALES DEPARTMENT)
- CB — ☐ MFP_b002 (OSAKA BRANCH・SECOND SALES DEPARTMENT)
- CB — ☐ MFP_b003 (OSAKA BRANCH・GENERAL AFFAIRS DEPARTMENT)

[EXECUTE] — BN

| DEVICE IDENTIFIER | ASSIGNED SERVER NAME |
|---|---|
| MFP_a001 | server-a.example.com |
| MFP_a002 | server-a.example.com |
| MFP_a003 | server-a.example.com |
| MFP_b001 | server-b.example.com |
| MFP_b002 | server-b.example.com |
| MFP_b003 | server-b.example.com |
| MFP_c001 | server-c.example.com |
| MFP_c002 | server-c.example.com |
| MFP_c003 | server-c.example.com |
| ⋮ | ⋮ |

| SERVER NAME | STATUS |
|---|---|
| server-a.example.com | ERROR |
| server-b.example.com | NORMAL |
| server-c.example.com | NORMAL |
| ⋮ | ⋮ |

| DEVICE IDENTIFIER | IP ADDRESS |
|---|---|
| MFP_a001 | 192.168.2.1 |
| MFP_a002 | 192.168.2.2 |
| MFP_a003 | 192.168.2.3 |
| ⋮ | ⋮ |

PRINTING SYSTEM, INTERMEDIATE SERVER, PRINTING DEVICE, JOB SYSTEM, METHOD FOR EXECUTING PRINT JOB, AND COMPUTER-READABLE STORAGE MEDIUM FOR COMPUTER PROGRAM

This application is based on Japanese patent application No. 2013-137767 filed on Jul. 1, 2013, the contents of which are hereby incorporated by reference.

BACKGROUND OF THE INVENTION

1. Field of the Invention

The present invention relates to a system and method for sending and receiving job data via a communication line, and so on.

2. Description of the Related Art

A printing device located in a network sometimes receives, via a so-called print server, data for printing from a terminal located in another network to carry out printing. As such printing methods, pull printing and push printing have been proposed.

Pull printing is a printing method. According to the method, a print server receives data for printing from a terminal, and saves the same temporarily. In response to a request from a printing device, the print server transfers the data for printing to the printing device. Then, the printing device carries out printing based on the data for printing.

Push printing is also a printing method. According to the method, a print server receives data for printing from a terminal and sends the same to a printing device independent of whether or not a request is sent from the printing device. Then, the printing device carries out printing based on the data for printing.

When a terminal and a printing device are located in different networks, it is necessary to solve a problem related to private IP address. A method has been proposed in Japanese Laid-open Patent Publication No. 2007-48031. According to the method, a hosting server is provided with a terminal device information storage management means storing and holding a printer port number of a printer, a port number, and a dynamic global IP address transmitted from a terminal device. The hosting server transmits information stored therein to the terminal device on the basis of information stored in the terminal device information storage management means. The terminal device transmits information thereon to the hosting server periodically or when the need arises to update the terminal device information storage management means of the hosting server.

In the meantime, a method has been proposed for executing push printing when it cannot be performed (Japanese Laid-open Patent Publication No. 2002-189581). According to the method, after a first printer receives a first print job (push print job) from a user computer, when the execution of the first print job becomes impossible due to the occurrence of any error, the first printer searches for a pertinent second printer in order to execute the first print job from a network, and issues, to the second printer, a second print job (pull print job) newly prepared on the basis of the first print job (Japanese Laid-open Patent Publication No. 2012-189581).

According to the method described in Japanese Laid-open Patent Publication No. 2002-189581, the first printer finds that executing a job for push printing is disabled after the first printer receives the push print job. If an upstream device of the first printer has a problem, the first printer can receive no print jobs. When no problem occurs in the first printer even if the upstream device thereof has a problem, it is desired that the first printer is caused to execute a print job.

SUMMARY

The present invention has been achieved in light of such an issue, and an object thereof is to, even if there is a problem with an upstream device of a printing device, enable the printing device to execute a print job.

According to one aspect of the present invention, an intermediate server used outside a network, the network having one or more printing devices and a distributing server for distributing data to each of said one or more printing devices, includes a receiving portion configured to receive job data for execution of a print job and designation data indicating an identifier of each of executing printing devices that are to execute the print job among said one or more printing devices; a first transmission portion configured to send, to the distributing server, the job data and the designation data received by the receiving portion; a saving portion configured to save the job data received by the receiving portion when the job data cannot be transferred to the distributing server; and a second transmission portion configured to send, in response to a request from any one of said one or more printing devices, the job data saved in the saving portion to the printing device as a request source.

These and other characteristics and objects of the present invention will become more apparent by the following descriptions of preferred embodiments with reference to drawings.

BRIEF DESCRIPTION OF THE DRAWINGS

FIG. 6 is a diagram showing an example of a device selection screen.

FIG. 8 is a diagram showing an example of a device assignment table.

FIG. 9 is a diagram showing an example of a status table.

FIG. 10 is a diagram showing an example of a device address table.

DESCRIPTION OF THE PREFERRED EMBODIMENTS

[General Outline of Printing System 5]

Figure 1:
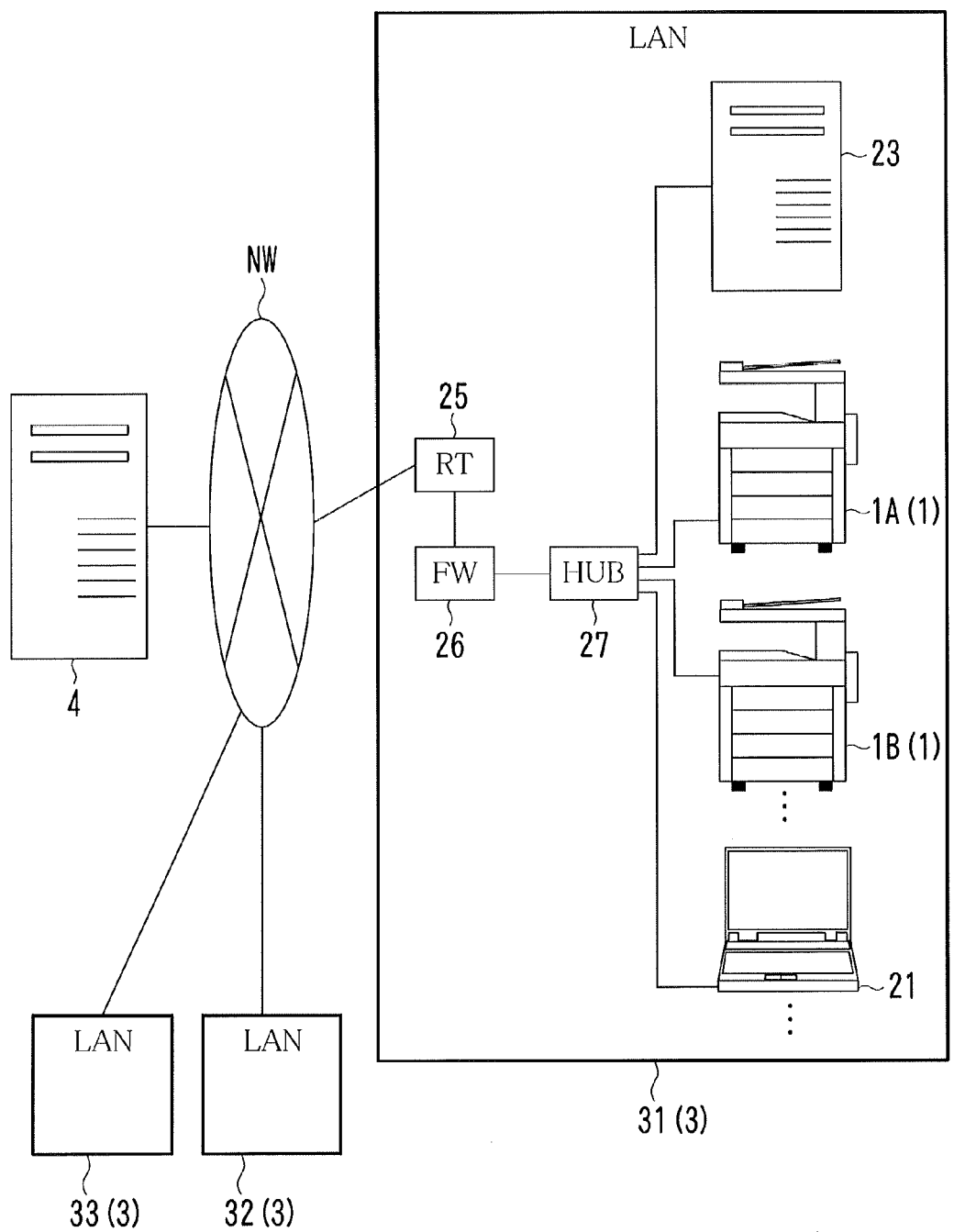
FIG. 1 is a diagram showing an example of the overall configuration of a printing system.

FIG. 1 is a diagram showing an example of the over all configuration of the printing system 5.

Referring to FIG. 1, the printing system 5 is configured of a plurality of Local Area Networks (LANs) 3, an intermediate server 4, a communication line NW, and so on. Each of the LANs 3 is connectable to the intermediate server 4 via the communication line NW. Examples of the communication line NW are the Internet, a public line, and a dedicated line.

The printing system 5 is used by members of a group, e.g., members of a company with branches. In short, the members of such a group are users of the printing system 5.

The LANs 3 are provided on a branch-by-branch basis. Hereinafter, the LANs 3 may be described separately as a "LAN 31", "LAN 32", "LAN 33", and so on.

The LAN 31 is configured of a plurality of image forming apparatuses 1, one or more terminals 21, a gateway server 23, a router 25, a firewall 26, a hub 27, and so on.

Each of the image forming apparatuses 1, each of the terminals 21, the gateway server 23, the router 25, and the firewall 26 is given a unique private Internet Protocol (IP) address and a unique MAC address.

The image forming apparatus 1 is an image processing apparatus that is generally called a Multi-Functional Peripheral (MFP) or a multifunction device. The image forming apparatus 1 is an apparatus into which functions of copying, PC printing, faxing, and scanning are consolidated. The PC printing function is a function to print a document onto paper based on data received from the terminal 21.

The image forming apparatuses 1 are installed on a division-by-division basis. Hereinafter, the image forming apparatuses 1 are sometimes described separately as an "image forming apparatus 1A", "image forming apparatus 1B", and so on.

Each of the image forming apparatuses 1 is configured to print a document based on data received via the intermediate server 4 from a device of the LAN 3 except for the LAN 31. The arrangement is described later in order.

The terminal 21 is a client in order to use the functions of the image forming apparatus 1 remotely.

The gateway server 23 serves to deliver (transfer) data sent from other LANs 3 such as the LAN 32 and LAN 33 to any of the image forming apparatuses 1. In particular, the gateway server 23 transfers data for a job of printing a document onto paper to any of the image forming apparatuses 1. Such a job is hereinafter referred to as a "print job". In short, the gateway server 23 has a role as a gateway, and receives print jobs from other LANs 3 to distribute the print jobs to the image forming apparatuses 1.

The gateway server 23 is given a unique server identifier, e.g., "server-a.example.com". The server identifier includes a server name of the gateway server 23 and a domain name of a domain to which the gateway server 23 belongs.

The router 25 serves to connect the LAN 31 to another network such as the Internet. The router 25 has a routing table which shows the correlation between the MAC address and a private IP address of each of the devices of the LAN 31 (the image forming apparatuses 1 and the terminals 21, for example), and performs routing.

The firewall 26 is provided between the router 25 and the hub 27. The firewall 26 serves to monitor communication performed by the devices of the LAN 31, and prevents an attack and unauthorized access from outside the LAN 31. In particular, in this embodiment, the firewall 26 severely restricts access from outside the LAN 31 as compared to access to the outside the LAN 31. In some cases, the functions of the firewall 26 are equipped in the router 25.

Each of the image forming apparatuses 1, each of the terminals 21, and the firewall 26 are connected to the hub 27.

The configuration discussed above makes it possible to perform communication between the devices of the LAN 31, and also to perform communication between the devices of the LAN 31 and a device external thereto under certain restrictions.

The intermediate server 4 serves to relay data for a print job from the terminal 21 of one LAN 3 to the image forming apparatus 1 of another LAN 3.

[Configuration of Each Device]

Figure 2:
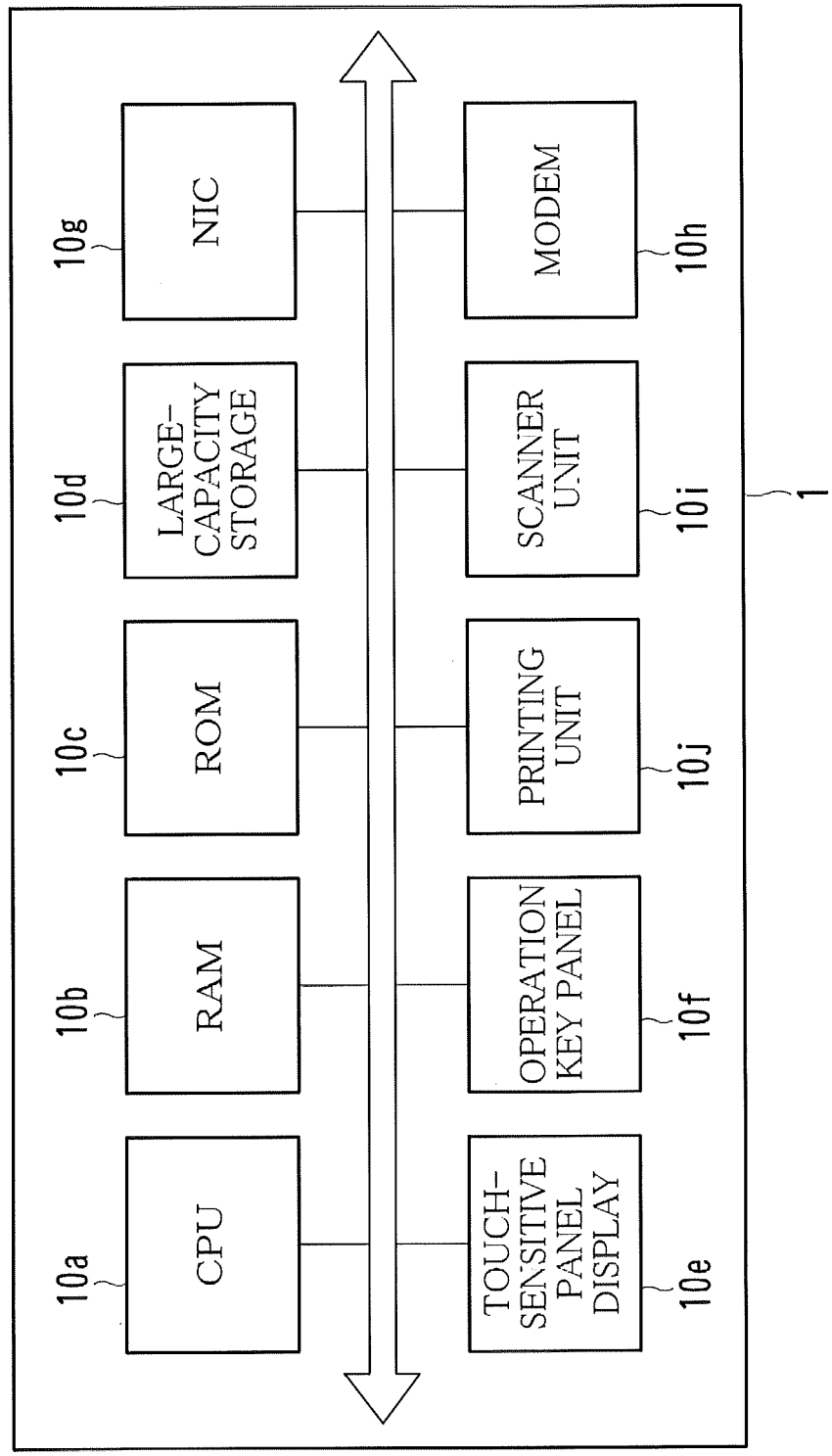
FIG. 2 is a diagram showing an example of the hardware configuration of an image forming apparatus.

FIG. 2 is a diagram showing an example of the hardware configuration of the image forming apparatus 1.

Figure 3:
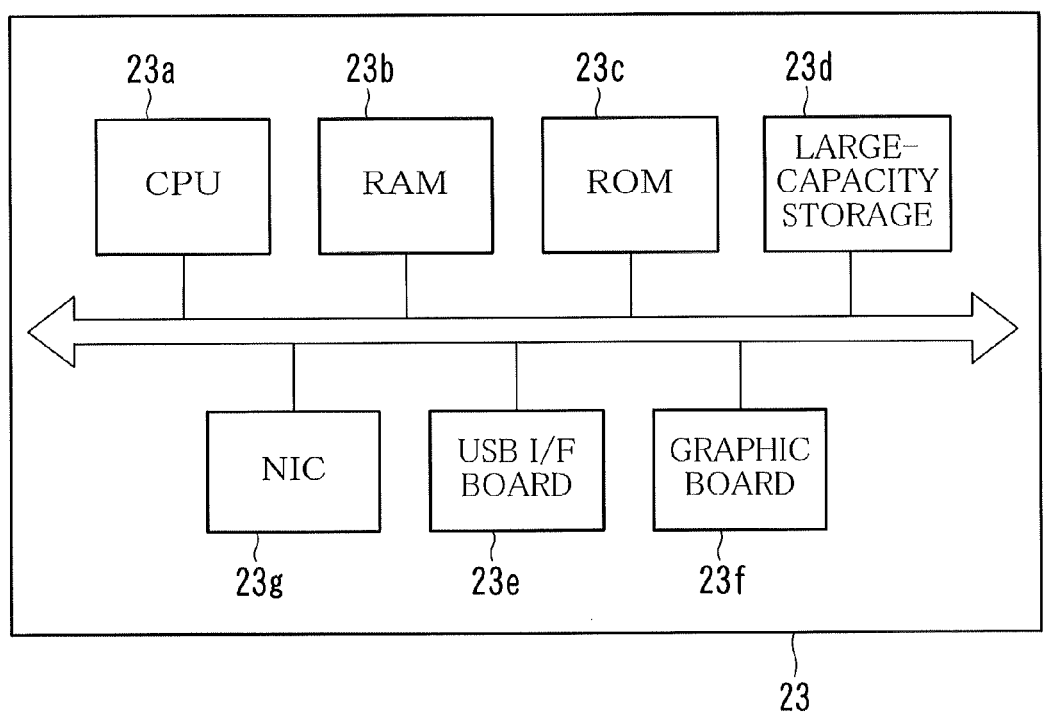
FIG. 3 is a diagram showing an example of the hardware configuration of a gateway server.

FIG. 3 is a diagram showing an example of the hardware configuration of the gateway server 23.

Referring to FIG. 2, the image forming apparatus 1 is configured of a Central Processing Unit (CPU) 10a, a Random Access Memory (RAM) 10b, a Read Only Memory (ROM) 10c, a large-capacity storage 10d, a touch-sensitive panel display 10e, an operation key panel 10f, a Network Interface Card (NIC) 10g, a modem 10h, a scanner unit 10i, a printing unit 10j, and so on.

The touch-sensitive panel display 10e displays, for example, a screen for presenting messages to a user, a screen for allowing a user to input commands or information, a screen for showing the results of processing executed by the CPU 10a. The touch-sensitive panel display 10e sends a signal indicating a touched position to the CPU 10a.

The operation key panel 10f is a so-called hardware keyboard, and is provided with a numeric keypad, a start key, a stop key, and a function key.

The NIC 10g performs communication with other devices in accordance with a protocol such as Transmission Control Protocol/Internet Protocol (TCP/IP) or an upper protocol. Examples of the upper protocol are Hypertext Transfer Protocol (HTTP), HTTP over transport layer Security (HTTPS), eXtensible Messaging and Presence Protocol (XMPP), and Simple Network Management Protocol (SNMP).

The modem 10h sends and receives image data with a facsimile terminal in accordance with a protocol such as G3.

The scanner unit 10i optically reads an image recorded on a sheet of paper placed on a platen glass, and generates image data thereof.

The printing unit 10j prints, onto paper, an image captured by the scanner unit 10i and an image received from other devices.

The ROM 10c or the large-capacity storage 10d stores, therein, software for implementing the foregoing functions such as copying. The ROM 10c or the large-capacity storage 10d also stores a relay print program 10P (see FIG. 4) therein. The relay print program 10P is used in order to receive a print job via the intermediate server 4 and to execute the print job.

These programs are loaded into the RAM 10b, and executed by the CPU 10a. The large-capacity storage 10d is, for example, a hard disk drive or a Solid State Drive (SSD).

Figure 5:
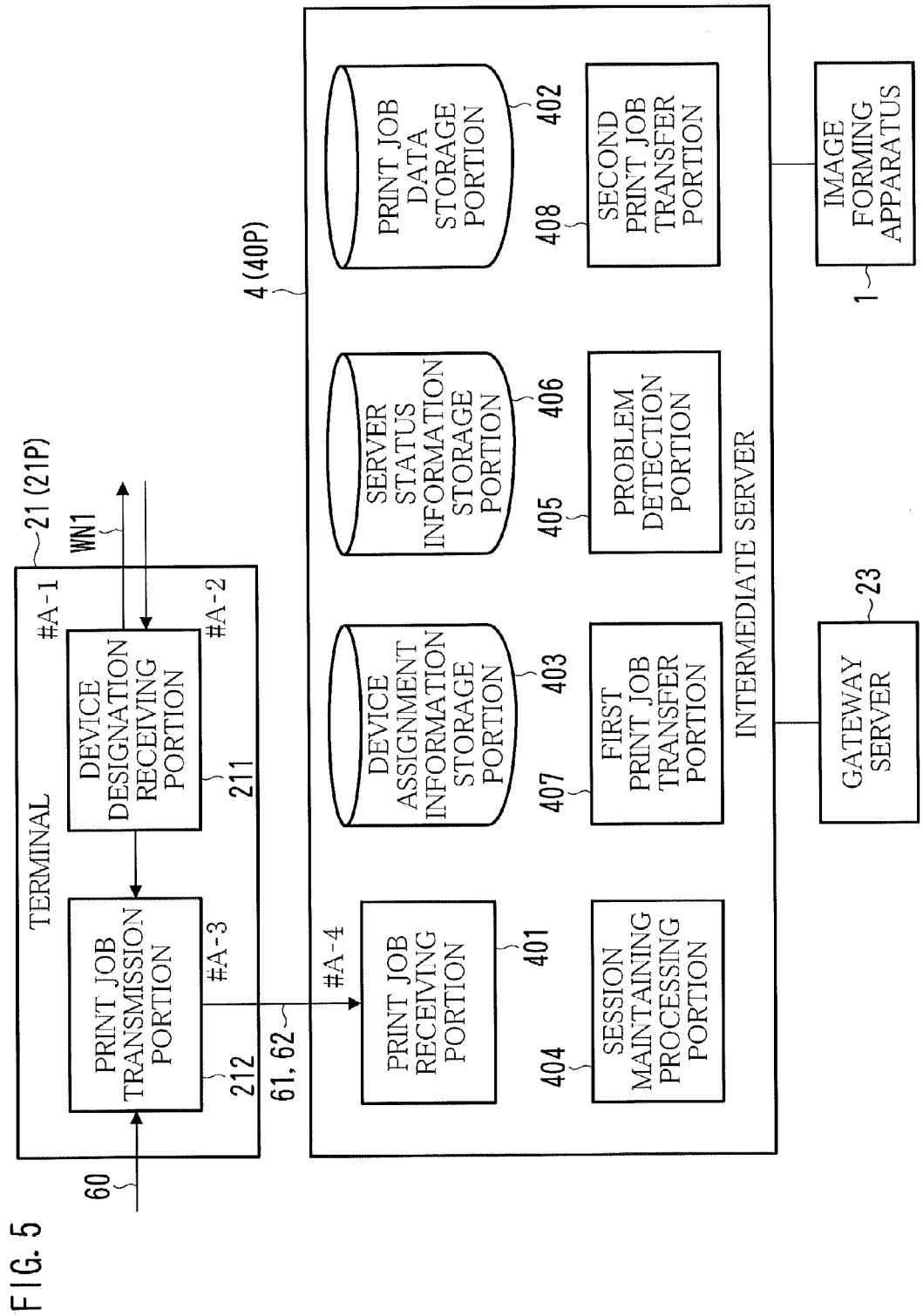
FIG. 5 is a diagram showing an example of the functional configuration of a terminal and of an intermediate server.

The terminal 21 stores, therein, a driver for the image forming apparatus 1 and a print command program 21P (see FIG. 5). The print command program 21P is used in order to instruct the intermediate server 4 to transfer data for a print job to the image forming apparatus 1 independent of which of the LANs 3 the image forming apparatus 1 belongs to. Examples of the terminal 21 are a personal computer, a tablet computer, and a smartphone.

Referring to FIG. 3, the gateway server 23 is configured of a CPU 23a, a RAM 23b, a ROM 23c, a large-capacity storage 23d, a Universal Serial Bus (USB) interface board 23e, a graphic board 23f, an NIC 23g, and so on.

The USB interface board 23e is a user interface to which an input device such as a keyboard or a pointing device is connected.

The graphic board 23f generates an image signal and outputs the image signal to a display unit. Thereby, an image is displayed on the display unit.

The NIC 23g is used to perform communication with another device in accordance with the foregoing protocols.

Figure 4:
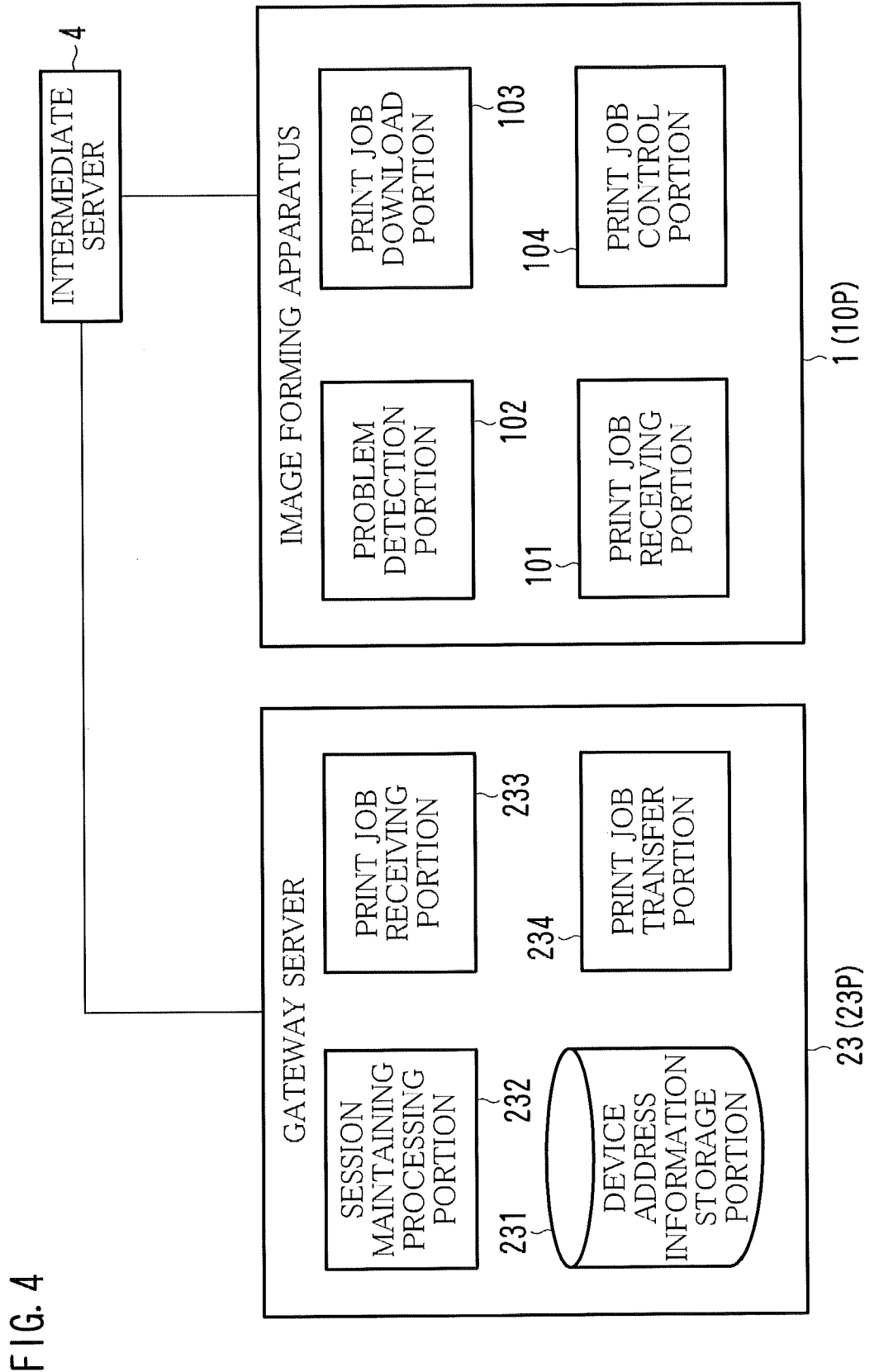
FIG. 4 is a diagram showing an example of the functional configuration of an image forming apparatus and of a gateway server.

The ROM 23c or the large-capacity storage 23d stores a data delivery program 23P (see FIG. 4). The data delivery program 23P is loaded into the RAM 23b, and is executed by the CPU 23a.

The hardware configuration of the intermediate server 4 is basically the same as that of the gateway server 23. The large-capacity storage of the intermediate server 4, however, stores a data relay program 40P (see FIG. 5) therein.

[Processing by Each Device]

FIG. 4 is a diagram showing an example of the functional configuration of the image forming apparatus 1 and of the gateway server 23. FIG. 5 is a diagram showing an example of the functional configuration of the terminal 21 and of the intermediate server 4.

The description goes on to processing by the devices using the relay print program 10P, the print command program 21P, the data delivery program 23P, and the data relay program 40P.

The relay print program 10P implements, in the image forming apparatus 1, the functions of a print job receiving portion 101, a problem detection portion 102, a print job download portion 103, a print job control portion 104, and so on as shown in FIG. 4.

The print command program 21P implements, in the terminal 21, the functions of a device designation receiving portion 211, a print job transmission portion 212, and so on as shown in FIG. 5.

The data delivery program 23P implements, in the gateway server 23, the functions of a device address information storage portion 231, a session maintaining processing portion 232, a print job receiving portion 233, a print job transfer portion 234, and so on, all of which are shown in FIG. 4.

The data relay program 40P implements, in the intermediate server 4, the functions of a print job receiving portion 401, a print job data storage portion 402, a device assignment information storage portion 403, a session maintaining processing portion 404, a problem detection portion 405, a server status information storage portion 406, a first print job transfer portion 407, a second print job transfer portion 408, and so on, all of which are shown in FIG. 5.

In some cases, the image forming apparatus 1 receives data for a print job to execute the print job without making a request to the intermediate server 4. In other cases, the image forming apparatus 1 requests data for a print job from the intermediate server 4 to execute the print job. In general, the former method, i.e., the print method in which data is received without making a request, is called "push printing". The latter method, i.e., the print method in which data is received after making a request, is called "pull printing".

Hereinafter, the descriptions of the processing by the individual portions shown in FIGS. 4 and 5 are broadly divided into the following parts: processing for transferring data from the terminal 21 to the intermediate server 4; processing for push printing; and processing for pull printing.

[Processing for Transferring Data from the Terminal 21 to the Intermediate Server 4]

FIG. 6 is a diagram showing an example of a device selection screen WN1.

The processing for transferring data from the terminal 21 to the intermediate server 4 is the same between the case of push printing and the case of pull printing.

The user prepares, in the terminal 21, data of a document to be printed. Hereinafter, such data is referred to as "document data 60". For example, the user may prepare the document data 60 by using an application installed on the terminal 21 to create a document. Alternatively, the user may prepare the document data 60 by downloading the same from a web site on the Internet. The user then enters a predetermined command into the terminal 21.

In response to this operation, the device designation receiving portion 211 of FIG. 5 performs processing for receiving a designation of the image forming apparatus 1 which is caused to print the document, for example, in the following manner.

The device designation receiving portion 211 displays the device selection screen WN1 as that shown in FIG. 6 on the display unit (#A-1 of FIG. 5). The user designates, on the device selection screen WN1, the image forming apparatus 1 which is caused to print the document, namely, the print destination, by selecting a checkbox CB corresponding to the print destination. The user may designate a plurality of the image forming apparatuses 1 on the device selection screen WN1. For the designation, it does not matter which of the LANs 3 the devices belong to. For example, with respect to the terminal 21 located in the LAN 32, the user may select the image forming apparatus 1 located in the LAN 31, or, select the image forming apparatus 1 located in the LAN 32. After finishing the selection, the user presses an execute button BN.

In response to this operation, the device designation receiving portion 211 receives, as the print destination, the image forming apparatus 1 corresponding to which the checkbox CB is checked (#A-2 of FIG. 5).

The print job transmission portion 212 converts the document data 60 into a predetermined Page Description Language (PDL) to generate print data 61, and sends the print data 61 to the intermediate server 4 (#A-3). At this time, the print job transmission portion 212 generates device designation data 62 indicating an identifier of the image forming apparatus 1 selected as the print destination (such an identifier being hereinafter referred to as a "device identifier"), and sends the device designation data 62 together with the print data 61 to the intermediate server 4.

The print data 61 and the device designation data 62 are sent in accordance with a protocol to which the restriction of the firewall 26 is not applied. For example, if data transmission from the LAN 3 to outside the LAN 3 in accordance with HTTP is permitted, then the print data 61 and the device designation data 62 are sent based on HTTP.

With the intermediate server 4, the print job receiving portion 401 of FIG. 5 receives the print data 61 and the device designation data 62 sent from the terminal 21 (#A-4).

The print data 61 is then transferred to the image forming apparatus 1 indicated in the device designation data 62 by using any one of the two methods provided below.

[Processing for Push Printing]

Figure 7:
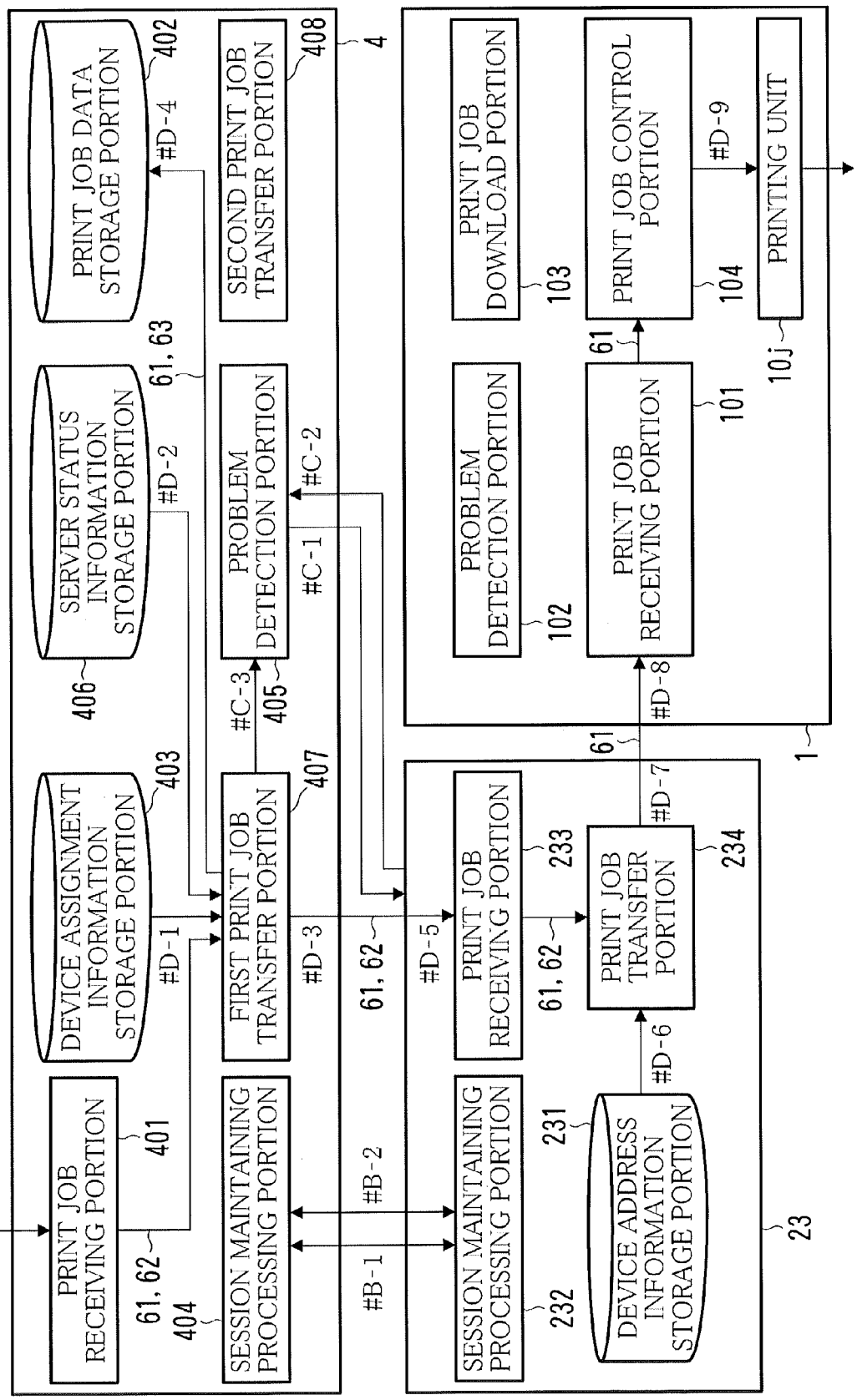
FIG. 7 is a diagram showing roles, for push printing, of the individual portions of an image forming apparatus, a gateway server, and an intermediate server.

FIG. 7 is a diagram showing roles, for push printing, of the individual portions of the image forming apparatus 1, the gateway server 23, and the intermediate server 4. FIG. 8 is a diagram showing an example of a device assignment table TL1. FIG. 9 is a diagram showing an example of a status table TL2. FIG. 10 is a diagram showing an example of a device address table TL3.

If the gateway server 23 of the LAN 3 in which the image forming apparatus 1 indicated in the device designation data 62 is located operates normally, and further, if the gateway server 23 is connected to the intermediate server 4, then the print data 61 is processed by push printing.

The push printing involves processing for maintaining a session between the intermediate server 4 and the gateway server 23, and processing for detecting a state of the gateway server 23. Both the processing are performed by the session maintaining processing portion 232 of the gateway server 23, the session maintaining processing portion 404, the problem detection portion 405, and the server status information storage portion 406 of the intermediate server 4, and so on. The description goes on to the processing by the individual portions with reference to FIG. 7, etc.

The device assignment information storage portion 403 stores the device assignment table TL1 therein. Referring to FIG. 8, the device assignment table TL1 shows, for each image forming apparatus 1, a server identifier of the gateway server 23 provided in the LAN 3 in which the image forming apparatus 1 is located so as to correspond to the device identifier of the image forming apparatus 1.

The session maintaining processing portion 232 and the session maintaining processing portion 404 perform processing for maintaining (keeping) a session between the gateway server 23 and the intermediate server 4. To be specific, if both the devices are not connected to each other, then the session maintaining processing portion 232 sends data on connection request to the intermediate server 4. The data on connection request may be sent from the session maintaining processing portion 404 to the gateway server 23. Then, the session maintaining processing portion 232 and the session maintaining processing portion 404 establish a session (#B-1 of FIG. 7). While being connected to each other, both the devices maintain the session, for example, by sending predetermined data from one to the other at regular time intervals (#B-2). These processing may be performed by known methods.

The problem detection portion 405 performs processing for detecting a problem with the gateway server 23, for example, in the following manner.

The problem detection portion 405 sends a predetermined signal (for example, a PING signal or polling signal) to the gateway server 23 at regular time intervals (#C-1 of FIG. 7). If receiving a reply to the predetermined signal within a preset time (#C-2), then the problem detection portion 405 determines that no problem occurs in the gateway server 23. Otherwise, the problem detection portion 405 determines that a problem occurs in the gateway server 23. As the address of the gateway server 23, the server identifier is used. To be specific, the problem detection portion 405 asks a Domain Name System (DNS) server about a global IP address corresponding to the server identifier. The problem detection portion 405 then sends the predetermined signal to the global IP address.

Alternatively, the problem detection portion 405 obtains information as to whether or not a first print job transfer portion 407 (described later) sends the print data 61 successfully (#C-3). If the print data 61 is not delivered to the gateway server 23 in spite of the fact that the print data 61 is sent to the gateway server 23, then the problem detection portion 405 determines that there is a problem with the gateway server 23. If the print data 61 is delivered to the gateway server 23, then the problem detection portion 405 determines that there is no problem with the gateway server 23.

The server status information storage portion 406 stores the status table TL2 therein. Referring to FIG. 9, the status table TL2 shows a status of each of the gateway servers 23. The default value is "normal". If the problem detection portion 405 detects a problem with the gateway server 23, the status of that gateway server 23 is updated with "error". Thereafter, if the problem detection portion 405 determines that there is no problem with the gateway server 23, then the status of that gateway server 23 is updated with "normal".

The first print job transfer portion 407 transfers the print data 61 and the device designation data 62 received by the print job receiving portion 401 to the gateway server 23 in the following manner.

The first print job transfer portion 407 extracts, from the device assignment table TL1 (see FIG. 8), a server identifier corresponding to the device identifier indicated in the device designation data 62 (#D-1 of FIG. 7). The first print job transfer portion 407 extracts, from the status table TL2 (see FIG. 9), a status corresponding to the extracted server identifier (#D-2). If the extracted status is "normal", then the first print job transfer portion 407 transfers the print data 61 and the device designation data 62 to the gateway server 23 corresponding to the server identifier (#D-3).

If a plurality of server identifiers is extracted from the device assignment table TL1, then the first print job transfer portion 407 extracts a status of each of the server identifiers, and transfers the print data 61 and the device designation data 62 only to the server identifier corresponding to the "normal" status.

On the other hand, if the status corresponding to the extracted server identifier is "error", then the print data 61 is not sent to the gateway server 23 corresponding to the extracted server identifier, and instead, the print data 61 is stored into the print job data storage portion 402 together with unsent designation data 63 (#D-4). The unsent designation data 63 indicates, among the device identifiers indicated in the device designation data 62, a device identifier of the image forming apparatus 1 located in the LAN 3 to which the gateway server 23 also belongs. Such a device identifier is known by referring to the device assignment table TL1 of FIG. 8. The print data 61 is then transferred to the image forming apparatus 1 without the gateway server 23. The processing is described later.

With the gateway server 23, the device address information storage portion 231 stores the device address table TL3 therein. Referring to FIG. 10, the device address table TL3 shows a device identifier and a private IP address for each of the image forming apparatuses 1 of the LAN 3 to which that gateway server 23 belongs.

The print job receiving portion 233 receives the print data 61 and the device designation data 62 sent from the intermediate server 4 (#D-5 of FIG. 7).

The print job transfer portion 234 transfers the print data 61 to the gateway server 23 in the following manner. The print job transfer portion 234 extracts, from the device address table TL3 (see FIG. 10), a private IP address corresponding to the device identifier indicated in the device designation data 62 (#D-6). If a plurality of device identifiers is indicated in the device designation data 62, then the print job transfer portion 234 extracts a private IP address corresponding to each of the device identifiers. The print job transfer portion 234 then transfers the print data 61 to the extracted private IP address (#D-7).

With the image forming apparatus 1, the print job receiving portion 101 receives the print data 61 from the gateway server 23 (#D-8).

The print job control portion 104 then controls the printing unit 10j and so on in such a manner that the print job is executed based on the print data 61 (#D-9). Instead of executing the print job immediately after the receipt of the print data 61, the print job may be executed after the user further performs specific operation, e.g., after the user enters a user ID and password into the touch-sensitive panel 10e of the image forming apparatus 1.

[Processing for Pull Printing]

Figure 11:
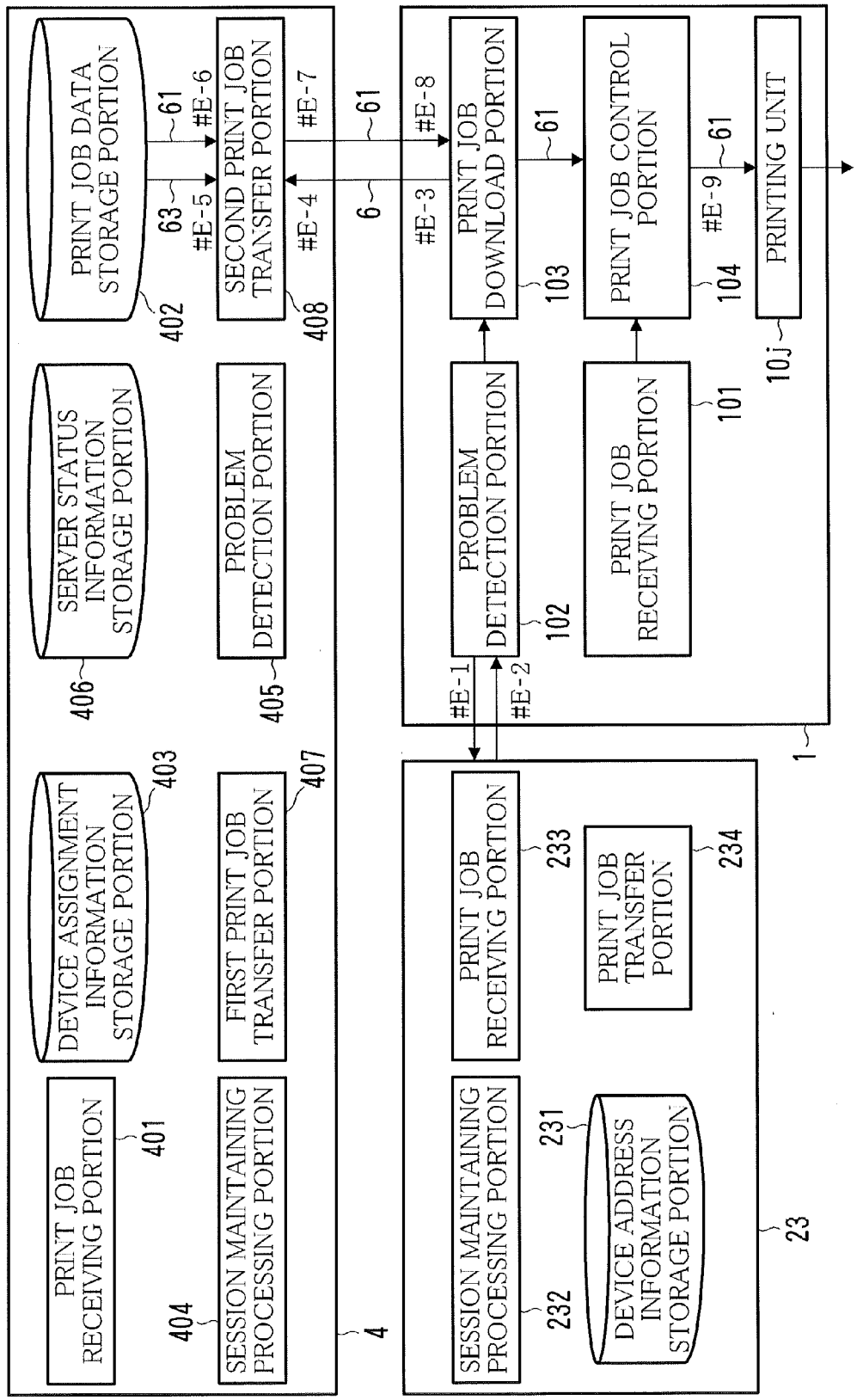
FIG. 11 is a diagram showing roles, for pull printing, of the individual portions of an image forming apparatus, a gateway server, and an intermediate server.

FIG. 11 is a diagram showing roles, for pull printing, of the individual portions of the image forming apparatus 1, the gateway server 23, and the intermediate server 4.

As discussed earlier, according to the first print job transfer portion 407, the print data 61 is not transferred to the gateway server 23 in which a problem occurs. Therefore, the image forming apparatus 1 located in the LAN 3 to which that gateway server 23 also belongs cannot receive the print data 61.

The image forming apparatus 1 therefore obtains the print data 61 without the gateway server 23. Following is a description, with reference to FIG. 11, of the example where the image forming apparatus 1A of the LAN 31 obtains the print data 61.

With the image forming apparatus 1A, the problem detection portion 102 periodically performs processing for detecting a problem with the gateway server 23 located in the LAN 31. As with the session maintaining processing portion 404 of the intermediate server 4, the problem detection portion 102 sends a predetermined signal (for example, a PING signal or polling signal) to the gateway server 23 (#E-1 of FIG. 11). If receiving a reply to the predetermined signal within a preset time (#E-2), then the problem detection portion 102 determines that no problem occurs in the gateway server 23. Otherwise, the problem detection portion 102 determines that a problem occurs in the gateway server 23.

If the problem detection portion 102 determines that a problem occurs in the gateway server 23, then the print job download portion 103 downloads the print data 61 from the intermediate server 4 in the following manner.

The print job download portion 103 establishes a session between the image forming apparatus 1A and the intermediate server 4, and sends the request data 64 to the intermediate server 4 (#E-3). The request data 64 indicates the device identifier of the image forming apparatus 1A.

In the intermediate server 4, when receiving the request data 64 (#E-4), the second print job transfer portion 408 performs processing for sending the print data 61 to the image forming apparatus 1A in the following manner.

The second print job transfer portion 408 searches in the print job data storage portion 402 for unsent designation data 63 showing the device identifier indicated in the request data 64 (in this example, the device identifier of the image forming apparatus 1A) (#E-5). The second print job transfer portion 408 reads the print data 61 associated with the unsent designation data 63 from the print job data storage portion 402 (#E-6) to send the print data 61 to the image forming apparatus 1A (#E-7)

With the image forming apparatus 1A, the print job download portion 103 receives the print data 61 (#E-8).

The print job control portion 104 then controls the printing unit 10j and so on in such a manner that the print job is executed based on the print data 61 (#E-9).

After the image forming apparatus 1A obtains the print data 61, the session between the image forming apparatus 1A and the intermediate server 4 may be ended. After the print data 61 is sent to the image forming apparatus 1A, the device identifier of the image forming apparatus 1A is deleted from the unsent designation data 63. Without device identifier in the unsent designation data 63, both the print data 61 and the unsent designation data 63 are deleted from the print job data storage portion 402.

During a period from when the problem detection portion 102 determines that there is a problem with the gateway server 23 to when the problem detection portion 102 determines that there is no problems therewith, the image forming apparatus 1 may be put in the pull printing mode. Then, the print job download portion 103 may perform polling at regular time intervals while the image forming apparatus 1 is put in the pull printing mode. To be specific, the print job download portion 103 may send the request data 64 to the intermediate server 4 to try to download the print data 61. When it is found that no problem occurs in the gateway server 23, the image forming apparatus 1 exits the pull printing mode and enters the push printing mode.

Figure 12:
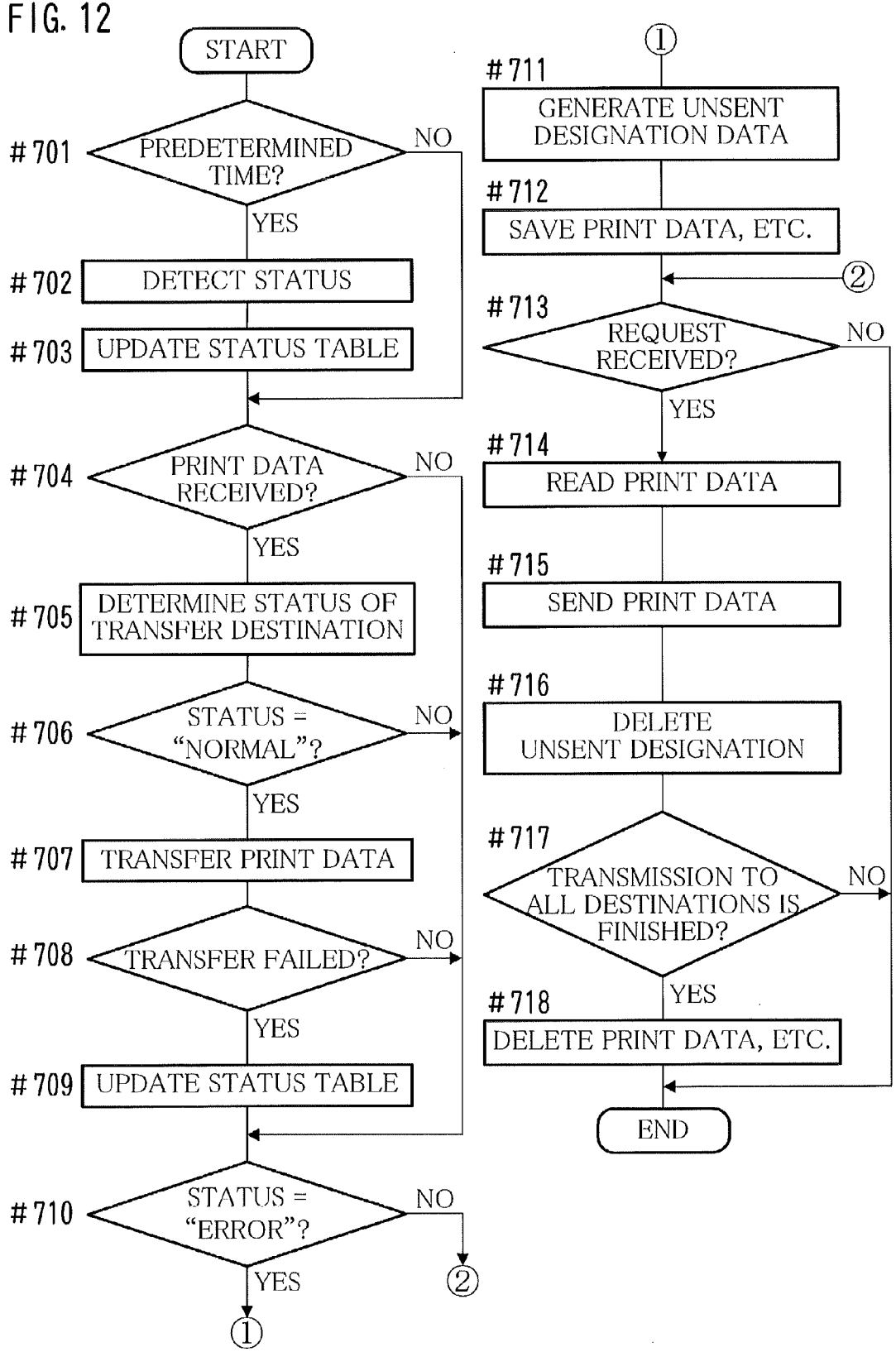
FIG. 12 is a flowchart for depicting an example of the flow of the overall processing performed by an intermediate server.
Figure 13:
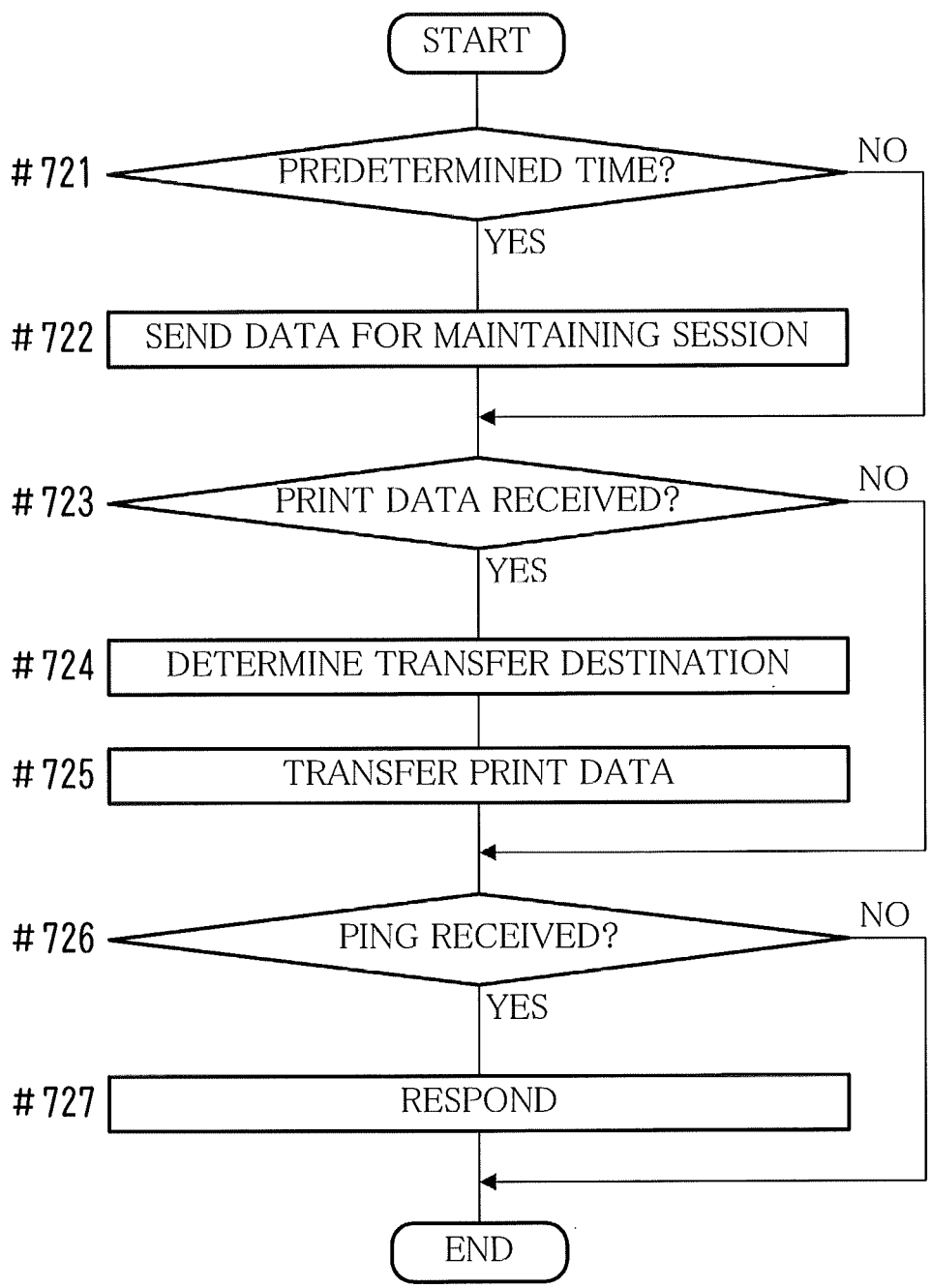
FIG. 13 is a flowchart for depicting an example of the flow of the overall processing performed by a gateway server.
Figure 14:
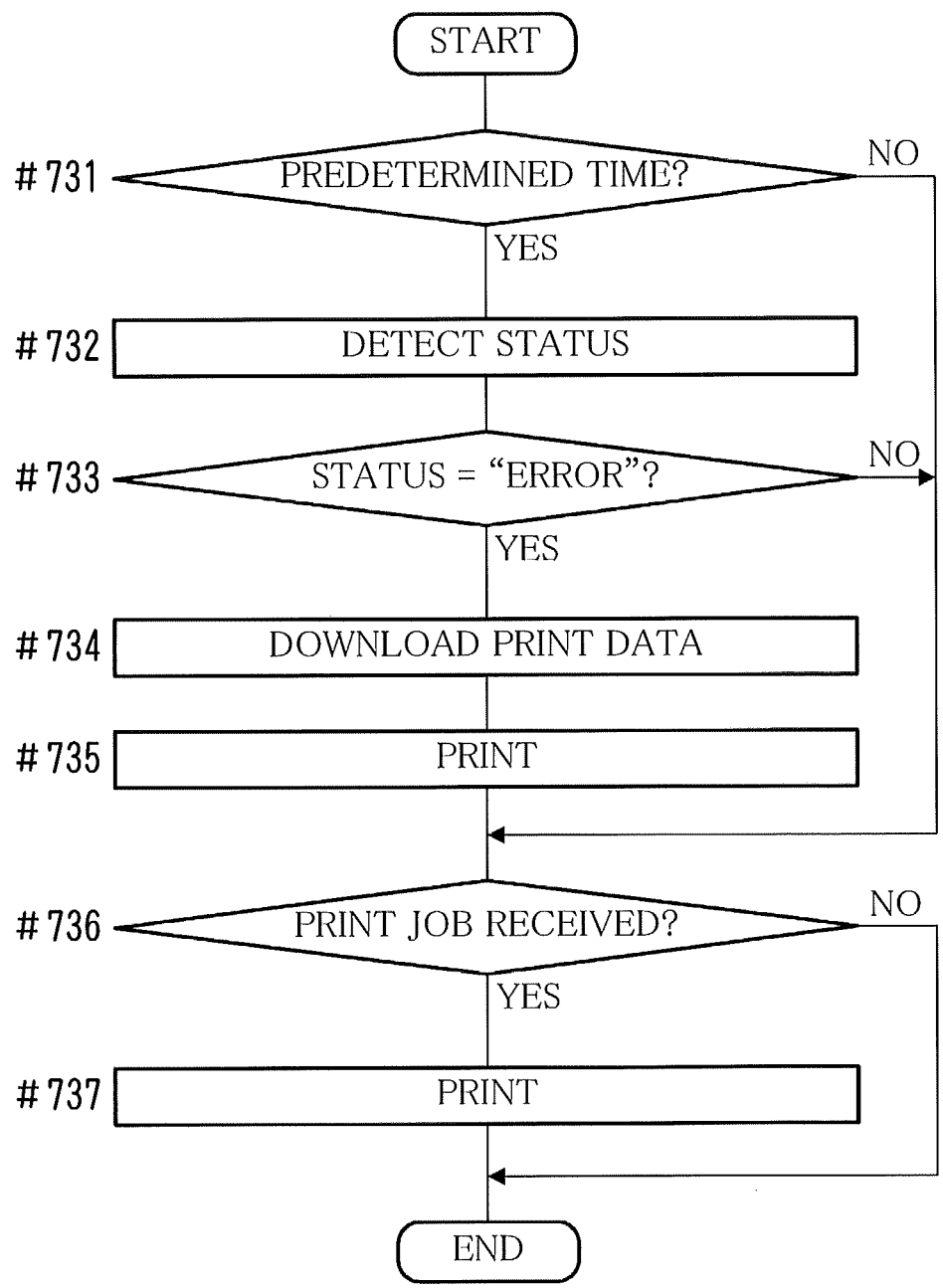
FIG. 14 is a flowchart for depicting an example of the flow of the overall processing performed by an image forming apparatus.

FIG. 12 is a flowchart for depicting an example of the flow of the overall processing performed by the intermediate server 4. FIG. 13 is a flowchart for depicting an example of the flow of the overall processing performed by the gateway server 23. FIG. 14 is a flowchart for depicting an example of the flow of the overall processing performed by the image forming apparatus 1.

The description goes on to the flow of the overall processing by the intermediate server 4, the gateway server 23, and the image forming apparatus 1 with reference to the flowcharts of FIGS. 12-14.

Every time an event occurs, the intermediate server 4 performs processing depending on the event as shown in FIG. 12.

If predetermined time is reached (Yes in Step #701), then the intermediate server 4 detects whether or not there is a problem with each of the gateway servers 23, for example, by sending a PING signal thereto (Step #702). The intermediate server 4 updates the status table TL2 (see FIG. 9) in accordance with the result of detection (Step #703).

If receiving the print data 61 and the device designation data 62 from the terminal 21 (Yes in Step #704), then the intermediate server 4 determines, based on the status table TL2, a status of the gateway server 23 of the LAN 3 in which the image forming apparatus 1 having the device identifier indicated in the device designation data 62 is located (Step #705).

The intermediate server 4 then transfers the print data 61 and the device designation data 62 to the gateway server 23 in which no problems occur (gateway server 23 showing the "normal" status) among the gateway servers 23 (Yes in Step #706, and Step #707). If there is the gateway server 23 to which the print data 61 and the device designation data 62 are not delivered (Yes in Step #708), then the intermediate server 4 updates the status table TL2 in such a manner that "error" is indicated as the status of that gateway server 23 (Step #709).

On the other hand, if there is the gateway server 23 determined, in Step #705 or Step #709, to have a problem (Yes in Step #710), then the intermediate server 4 generates unsent designation data 63 (Step #711) to store the same together with the print data 61 into the print job data storage portion 402 (Step #712). Thereby, the print data 61 is associated with the device identifier, among the device identifiers indicated in the device designation data 62, of the image forming apparatus 1 which has not yet received the print data 61, and the resultant is saved to the print job data storage portion 402.

If receiving the request data 64 from the image forming apparatus 1 (Yes in Step #713), then the intermediate server 4 reads, from the print job data storage portion 402, the print data 61 associated with the device identifier of the image forming apparatus 1 (Step #714), and sends the print data 61 to the image forming apparatus 1 (Step #715). The intermediate server 4 then deletes the relation between the print data 61 and the device identifier of the image forming apparatus 1 (Step #716). As a result, if the number of device identifiers related to the print data 61 reaches zero (Yes in Step #717), then the intermediate server 4 deletes the print data 61 from the print job data storage portion 402 (Step #718).

Every time an event occurs, the gateway server 23 performs processing depending on the event as shown in FIG. 13.

If predetermined time is reached (Yes in Step #721), then the gateway server 23 performs processing for maintaining the session with the intermediate server 4, e.g., sending predetermined data (Step #722).

If receiving the print data 61 and the device designation data 62 from the intermediate server 4 (Yes in Step #723), then the gateway server 23 determines, based on the device address table TL3 (see FIG. 10), a private IP address corresponding to the device identifier indicated in the device designation data 62 (Step #724). The gateway server 23 transfers the print data 61 to each private IP address thus determined (Step #725).

If receiving the PING signal (Step #726), then the gateway server 23 responds to the PING signal (Step #727).

Every time an event occurs, the image forming apparatus 1 performs processing depending on the event as shown in FIG. 14.

If predetermined time is reached (Yes in Step #731), then the image forming apparatus 1 detects whether or not a problem occurs in the local gateway server 23, i.e., the gateway server 23 located in the LAN 3 where the image forming apparatus 1 is also located, for example, by sending a PING signal thereto (Step #732). If a problem occurs in the local gateway server 23 (Yes in Step #733), then the image forming apparatus 1 accesses the intermediate server 4 to download the print data 61 to be sent to the image forming apparatus 1 (Step #734). After downloading the print data 61, the image forming apparatus 1 prints a document based on the print data 61 (Step #735).

If receiving the print data 61 from the gateway server 23 (Yes in Step #736), then the image forming apparatus 1 prints a document based on the print data 61 (Step #737).

In this embodiment, if a problem occurs in the gateway server 23, i.e., an upstream device which delivers the print data 61, the image forming apparatus 1 switches the mode from the push printing mode to the pull printing mode. Therefore, even when a problem occurs in the gateway server 23, the image forming apparatus 1 can download the print data 61 to execute a print job.

In this embodiment, the problem detection portion 405 of the intermediate server 4 detects whether or not there is a problem with the gateway server 23 at regular time intervals. Instead of this, however, the problem detection portion 405 may make the detection at a time when the print data 61 and the device designation data 62 are received. In such a case, the problem detection portion 405 may detect whether or not there is a problem only with the gateway server 23 located in the LAN 3 to which the image forming apparatus 1 having the device identifier indicated in the device designation data 62 also belongs.

In the foregoing embodiment, the example is described in which the image forming apparatus 1 is caused to execute a print job. Instead of this, however, the embodiment is also applicable to the case where the image forming apparatus 1 is caused to execute other kinds of jobs. For example, it is possible to cause the image forming apparatus 1 to execute a job of sending a document to another device via facsimile communication. In such a case, the user designates a facsimile number of the transmission destination on the terminal 21. The terminal 21 sends the designated facsimile number together with the print data 61. Both the gateway server 23 and the intermediate server 4 transfer the facsimile number together with the print data 61. The image forming apparatus 1 receives the print data 61 and the facsimile number, and then, sends a document to the received facsimile number via facsimile communication, instead of printing the document onto paper.

In this embodiment, the device address table TL3 shows the device identifier and the private IP address for each of the image forming apparatuses 1. Instead of the private IP address, another local identifier may be used. For example, in the case where the LAN 3 corresponds to a domain or work group of a Windows (registered trademark) network, the computer name (host name) may be used instead of the private IP address.

In the foregoing embodiment, the image forming apparatus 1 periodically detects whether or not there is a problem with the gateway server 23. Then, if a problem is found in the gateway server 23, the image forming apparatus 1 requests the print data 61 from the intermediate server 4. Instead of this arrangement, the image forming apparatus 1 may make the request at different timing. For example, the image forming apparatus 1 may make the request at a time when the user enters a specific command. Alternatively, the image forming apparatus 1 may make the request at a time when the image forming apparatus 1 exits the sleep mode (power saving mode) and enters again to the normal mode (mode which allows printing to start promptly). The requests at the different timing may be made only during a period after the problem with the gateway server 23 is detected until when the problem with the gateway server 23 is solved, namely, only during the pull printing mode.

It is to be understood that the configurations of the printing system 5, the image forming apparatus 1, the terminal 21, the gateway server 23, and the intermediate server 4, the constituent elements thereof, the content and order of the processing, the configuration of table, and the like can be appropriately modified without departing from the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An intermediate server used outside a network, the network having one or more printing devices and a distributing server for distributing data to each of said one or more printing devices, the intermediate server comprising:
    a receiving portion configured to receive job data for execution of a print job and designation data indicating an identifier of each of executing printing devices that are to execute the print job among said one or more printing devices;
    a first transmission portion configured to send, to the distributing server, the job data and the designation data received by the receiving portion;
    a saving portion configured to save the job data received by the receiving portion when the job data cannot be transferred to the distributing server; and
    a second transmission portion configured to send, in response to a request from any one of said one or more printing devices, the job data saved in the saving portion to the printing device as a request source.

2. The intermediate server according to claim 1, comprising a detection portion configured to detect a problem at regular time intervals; wherein
    the first transmission portion sends the job data and the designation data for a case where the problem is not detected by the detection portion, and does not send the job data and the designation data for a case where the problem is detected by the detection portion.

3. The intermediate server according to claim 1, wherein the saving portion saves the job data in association with the identifier indicated in the designation data, cancels, every time the second transmission portion sends the job data to the request source of the request, the association between the job data and the identifier of the request source, and deletes the job data at a time when no more identifiers are associated with the job data.

4. A printing system comprising:
said one or more printing devices according to claim 1;
the intermediate server according to claim 1; and
the distributing server according to claim 1; wherein
the distributing server includes
   a storage portion configured to store, for each of said one or more printing devices, the identifier and a local second identifier in the network in such a manner that the identifier and the second identifier are associated with each other,
   a second receiving portion configured to receive the job data and the designation data from the intermediate server, and
   a third transmission portion configured to send the job data received by the second receiving portion to the executing printing device based on the second identifier corresponding to the identifier indicated in the designation data received by the second receiving portion,
each of said one or more printing devices includes
   a third receiving portion configured to receive the job data from the distributing server,
   a request portion configured to send a request to the intermediate server,
   a fourth receiving portion configured to receive the job data from the intermediate server, and
   a job execution portion configured to execute the print job based on the job data received by the third receiving portion or the fourth receiving portion.

5. The printing system according to claim 4, wherein
each of said one or more printing devices includes a detection portion configured to detect a problem occurring in the distributing server, and
the request portion sends the request for a case where the problem is detected by the detection portion.

6. The printing system according to claim 4, wherein the request portion sends the request for a case where a user enters a predetermined command.

7. The printing system according to claim 4, wherein the request portion sends the request for a case where the printing device exits a sleep mode.

8. The printing system according to claim 4, wherein
the intermediate server includes a second detection portion configured to detect a problem at regular time intervals, and
the first transmission portion sends the job data and the designation data for a case where the problem is not detected by the second detection portion, and does not send the job data and the designation data for a case where the problem is detected by the second detection portion.

9. The printing system according to claim 4, wherein the saving portion saves the job data in association with the identifier indicated in the designation data, cancels, every time the second transmission portion sends the job data to the request source of the request, the association between the job data and the identifier of the request source, and deletes the job data at a time when no more identifiers are associated with the job data.

10. A printing device used with a distributing server in one network to execute a print job based on job data, the printing device comprising:
a receiving portion configured to receive the job data via the distributing server from an intermediate server external to said one network; and
a download portion configured to request, for a case where a problem occurs in the distributing server, the job data from the intermediate server to receive the job data without the distributing server.

11. The printing device according to claim 10, comprising a detection portion configured to detect a problem occurring in the distributing server; wherein
the download portion requests the job data for a case where the problem is detected by the detection portion.

12. The printing device according to claim 10, wherein the download portion requests the job data for a case where a user enters a predetermined command.

13. The printing device according to claim 10, wherein the download portion requests the job data for a case where the printing device exits a sleep mode.

14. A non-transitory computer-readable storage medium storing thereon a computer program used in an intermediate server external to a network, the network having one or more printing devices and a distributing server for distributing data to each of said one or more printing devices, the computer program causing the intermediate server to perform processing comprising:
first processing for receiving job data for execution of a print job and designation data indicating an identifier of each of executing printing devices that are to execute the print job among said one or more printing devices;
second processing for sending, to the distributing server, the job data and the designation data received;
third processing for saving the job data received to a saving portion when the job data cannot be transferred to the distributing server; and
fourth processing for sending, in response to a request from any one of said one or more printing devices, the job data saved in the saving portion to a printing device as a request source.

15. The non-transitory computer-readable storage medium according to claim 14, wherein
the computer program causes the intermediate server to perform fifth processing for detecting a problem at regular time intervals, and
the computer program causes the intermediate server to perform the second processing for a case where the problem is not detected in the fifth processing, and does not cause the intermediate server to perform the second processing for a case where the problem is detected in the fifth processing.

16. The non-transitory computer-readable storage medium according to claim 14, wherein
the computer program causes the intermediate server to perform, as the third processing, processing for saving the job data in association with an identifier indicated in the designation data,
the computer program causes the intermediate server to perform sixth processing for canceling, every time the job data is sent to the request source of the request, the association between the job data and the identifier of the request source, and the computer program causes the intermediate server to perform seventh processing for deleting the job data at a time when no more identifiers are associated with the job data.

17. A non-transitory computer-readable storage medium storing thereon a computer program for a printing device used with a distributing server in one network to execute a print job based on job data, the computer program causing the printing device to perform processing comprising:
   first processing for receiving the job data via the distributing server from an intermediate server external to said one network; and
   second processing for requesting, for a case where a problem occurs in the distributing server, the job data from the intermediate server to receive the job data without the distributing server.

18. The non-transitory computer-readable storage medium according to claim 17, wherein
   the computer program causes the printing device to perform third processing for detecting a problem occurring in the distributing server, and
   the computer program causes the printing device to perform the second processing for a case where the problem is detected in the third processing.

19. The non-transitory computer-readable storage medium according to claim 17, wherein
   the computer program causes the printing device to perform the second processing for a case where a user enters a predetermined command.

20. The non-transitory computer-readable storage medium according to claim 17, wherein
   the computer program causes the printing device to perform the second processing for a case where the printing device exits a sleep mode.

* * * * *